United States Patent [19]

Godino et al.

[11] Patent Number: 4,738,694
[45] Date of Patent: Apr. 19, 1988

[54] PROCESS AND PLANT FOR PURIFICATION BY ADSORPTION ON ACTIVATED CARBON AND CORRESPONDING ADSORBER VESSEL

[75] Inventors: Claude Godino, Biviers; Philippe Duval, Echirolles; Benoît Ghnassia-Daudin, Voreppe, all of France

[73] Assignee: L'Air Liquide Societe Anonyme pour L'Etude et L'Exploitation des Procedes Georges Claude, Paris, France

[21] Appl. No.: 7,245

[22] PCT Filed: Apr. 22, 1986

[86] PCT No.: PCT/FR86/00132
§ 371 Date: Dec. 22, 1986
§ 102(e) Date: Dec. 22, 1986

[87] PCT Pub. No.: WO86/06295
PCT Pub. Date: Nov. 6, 1986

[30] Foreign Application Priority Data

Apr. 25, 1985 [FR] France .................... 85 06305

[51] Int. Cl.⁴ ........................................... B01D 53/04
[52] U.S. Cl. ................................. 55/59; 55/74; 55/179; 55/208; 55/387; 62/12; 62/18
[58] Field of Search .............. 55/59, 62, 74, 179, 55/208, 387; 62/12, 17, 18

[56] References Cited

U.S. PATENT DOCUMENTS

| | | | |
|---|---|---|---|
| 1,661,104 | 2/1928 | Barnebey | 55/208 X |
| 1,737,822 | 12/1929 | Barnebey | 55/208 X |
| 2,186,844 | 1/1940 | Smith | 55/208 X |
| 3,224,168 | 12/1965 | Gregory | 55/208 |
| 3,335,550 | 8/1967 | Stern | 55/208 |
| 3,596,438 | 8/1971 | Beukenkamp et al. | 55/59 |
| 4,282,015 | 8/1981 | Bartoschek et al. | 55/208 X |
| 4,414,003 | 11/1983 | Blaudszun | 55/208 X |
| 4,425,142 | 1/1984 | Mann | 55/208 X |
| 4,516,988 | 5/1985 | Winter | 55/59 |
| 4,522,636 | 6/1985 | Markbreiter et al. | 55/208 X |
| 4,589,890 | 5/1986 | Gronvaldt | 55/59 |

FOREIGN PATENT DOCUMENTS

| | | | |
|---|---|---|---|
| 411636 | 4/1925 | Fed. Rep. of Germany . | |
| 3117310 | 11/1982 | Fed. Rep. of Germany | 55/208 |
| 1003705 | 3/1952 | France . | |
| 1298651 | 6/1962 | France . | |
| 14167 | 2/1978 | Japan | 55/208 |
| 283508 | 6/1929 | United Kingdom . | |
| 485985 | 5/1938 | United Kingdom | 55/59 |

*Primary Examiner*—Robert Spitzer
*Attorney, Agent, or Firm*—Young & Thompson

[57] ABSTRACT

A gas is purified by adsorption on activated carbon contained in an adsorber vessel. The carbon is desorbed by passing an inert gas therethrough at a sufficiently high temperature. The desorbed impurity is removed by refrigeration and the refrigeration is supplied by the vaporization of an inert gas in liquid phase. This vaporized inert gas, in turn, comprises the desorption gas.

14 Claims, 2 Drawing Sheets

PROCESS AND PLANT FOR PURIFICATION BY ADSORPTION ON ACTIVATED CARBON AND CORRESPONDING ADSORBER VESSEL

The present invention relates to a process for purifying a gas by adsorption on activated carbon. It is more particularly applicable in the purification of air or nitrogen containing a solvent and coming for example from a grease removing machine.

Purification by adsorption on activated carbon is in wide use and the activated carbon is usually regenerated by steam. However, this technique has major drawbacks in respect of the desorption of solvents which are mixable with water since a rectification is thereafter necessary for recovering the solvent and for the desorption of chlorinated solvents, since the steam reacts on the solvents and produces hydrochloric acid which renders them unusable. Further, irrespective of the solvent, the regeneration by steam is very costly in consumption of energy.

It is moreover known to purify gases by passing them through a refrigerating trap which separates the impurity, in particular the solvent, by condensation. However, when the content of the impurity in the gas is low this results in high investment and operating costs, since the whole of the stream of gas to be treated must be circulated and cooled.

An object of the invention is to permit the recovery of the impurity under industrial economically acceptable conditions.

The invention therefore provides a process for purifying a gas by adsorption on activated carbon, characterized in that it comprises desorbing the activated carbon by passing a current of inert gas through the activated carbon and then in a refrigerating trap maintained at a temperature of condensation of the impurity of the gas treated and cooled by the vaporization of said inert gas stored in the liquid form, at least a part of the inert gas thus vaporized being used for effecting the desorption of the activated carbon.

According to an advantageous manner of carrying out the process, the desorption comprises a preheating stage in which a charge of inert gas is circulated in a closed loop through the activated carbon until its content of impurity reaches a predetermined threshold, and an eluting stage in which the inert gas is circulated through the activated carbon and sent to the refrigerating trap.

The invention also provides a plant for carrying out such a process. This plant, of the type comprising an adsorber vessel filled with activated carbon, is characterized in that it comprises means for vaporizing a liquified inert gas, means for feeding the adsorber vessel with at least a part of the inert gas which is thus vaporized, and means for cooling the gas issuing from said vessel by heat exchange with the inert gas in the course of vaporization.

The invention further comprises an adsorber vessel employing activated carbon which is particularly suitable for such a plant. This adsorber vessel is characterized in that it comprises heat exchange tubes disposed longitudinally in the vessel and provided with longitudinal fins, said tubes being connected in series with fluid circulating means disposed in the lateral wall of the adsorber vessel.

One embodiment of the invention will now be described with reference to the accompanying drawings, in which.

Figure 1:
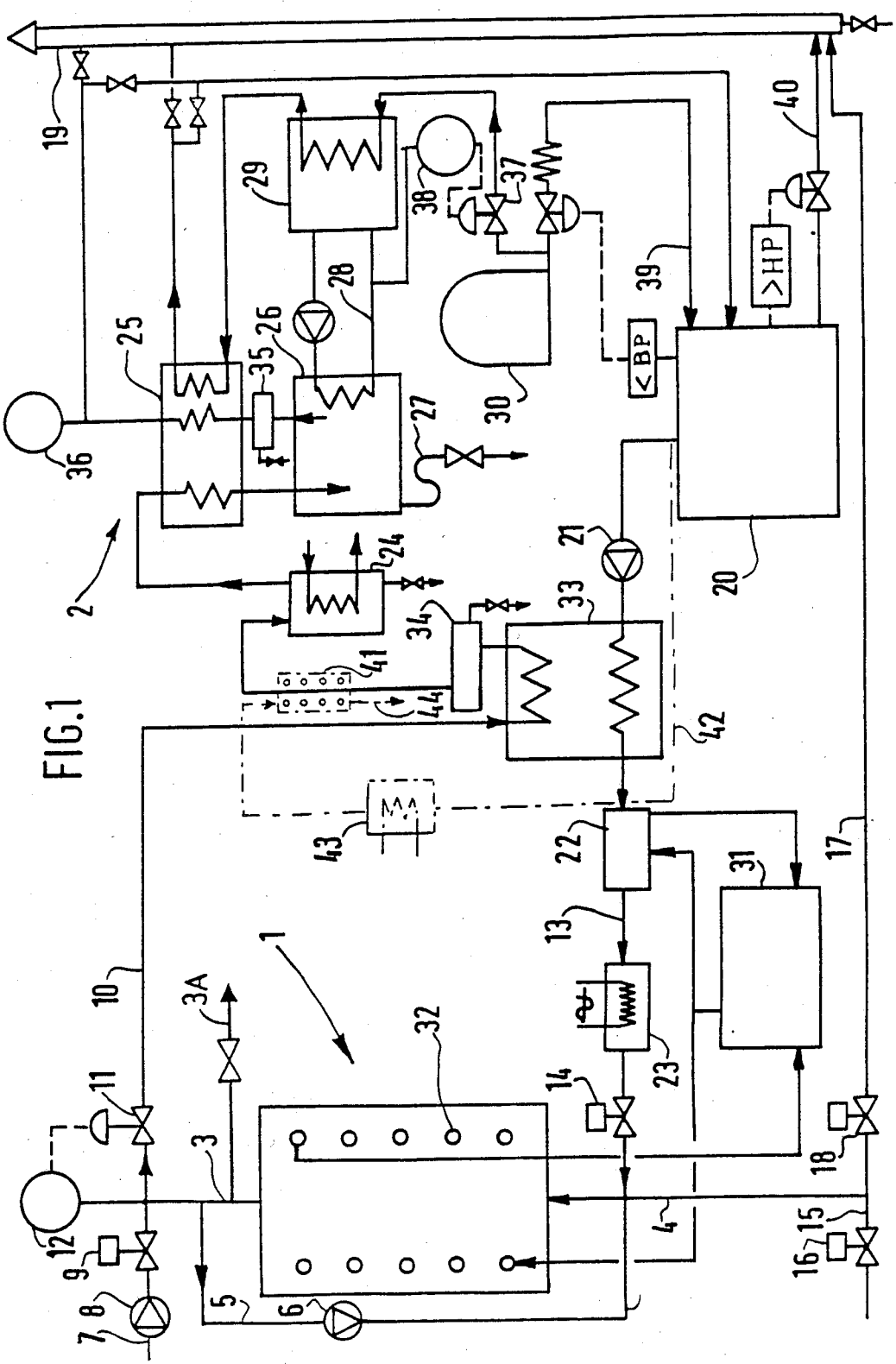
FIG. 1 is a diagrammatic view of a purifying plant according to the invention.

The plant represented in FIG. 1 is adapted to effect the purification of a gaseous stream, in practice a stream of air or nitrogen containing a solvent in the gaseous form, for example a chlorinated solvent. This stream comes from a machine (not shown) using this solvent, which is for example a grease-removing machine. The plant mainly comprises an adsorber vessel 1 and a refrigerating trap 2.

The vessel 1 is cylindrical and has a vertical axis and is filled with activated carbon; connected to its two ends are respectively an upper conduit 3 and a lower conduit 4 which are interconnected by a conduit 5 provided with a fan 6 so as to form a closed loop.

The conduit 3 is connected to a supply conduit 7 for the gas to be purified, provided with a fan 8 and a stop valve 9, and a purge conduit 10 leading to the trap 2; this conduit 10 is controlled by a valve 11 piloted by an analyser 12 of the gas contained in the conduit 3.

Connected to the conduit 4 are a conduit 13 supplying desorption nitrogen controlled by a stop valve 14, a conduit 15 for recycling the purified gas and provided with a stop valve 16, and a discharge conduit 17 provided with a stop valve 18 communicating with a flue 19. The conduit 13 comes from a buffer chamber 20 containing gaseous nitrogen at ambient temperature and is provided with a fan 21, a pre-reheater 22 and a final electric heater 23.

The refrigerating trap 2, which is in this example a cryogenic trap, mainly comprises a pre-cooling exchanger 24 employing water, a cooling exchanger 25 and a cryogenic exchanger 26 provided with a purge conduit 27 for recovering the solvent. The exchanger 26 is cooled by an intermediate fluid circulating in a closed loop 28 and cooled by vaporization in a heat exchanger 29 of liquid nitrogen coming from a storage vessel 30.

The plant further comprises a unit 31 producing hot water, steam or another hot fluid feeding on one hand the pre-reheater 22 and on the other hand a hollow heating coil 32 disposed in the adsorber vessel 1 within the activated carbon, and a recovered heat exchanger 33 which puts conduit 10 in thermal exchange relation with the conduit 13, between the chamber 20 and the pre-reheater 22. Further, the parts of the plant which operate at a temperature far from the ambient temperature are suitably heat insulated.

The operation of this plant will be described hereinafter in assuming that it comprises a single adsorber vessel 1. However, it will be understood that in practice the plant will usually comprise a plurality of adsorber vessels having staggered operating cycles.

1—Adsorption Stage

The gas to be treated is introduced at ambient temperature through the conduits 7 and 3 into the vessel 1, leaves the latter in the purified state through the conduit 4 and is either recycled through the conduit 15 (in particular in the case of nitrogen) to the associated machine using the solvent, or discharged through the conduit 17 and the flue 19. During this stage, the vessel 1 may optionally be refrigerating, for example by circulating a cold fluid, in particular cold water, in the coil 32. When the adsorption has finished, which may be determined by inspecting the solvent content of the gas contained in the conduit 4, the activated carbon is regenerated in the following manner:

2—Desorption Stage

This stage (to which the arrows shown in FIG. 1 correspond) comprises successive preheating and eluting stages which will be described hereinafter.

Assuming first of all that the purified gas is air, this air is first purged through a conduit 3A connecting the conduit 3 to the flue 19, by means of nitrogen taken from the chamber 20.

A calorigenic fluid is sent by the unit 31 into the coil 32 for preheating the activated carbon. The gas contained in the vessel 1 is circulated in a closed loop through the circuit 5 so as to improve the thermal exchange until the analyser 12 detects a predetermined content of solvent. The valve 11 is then opened and a continuous stream of nitrogen heated to 130° C., coming from the chamber 20, is supplied through the conduit 4 to the vessel 1 and leaves the latter through the conduit 10 at 100°–130° C. The calories of nitrogen issuing from the vessel 1 are partly recovered by the heat exchanger 33 so as to bring the stream of nitrogen from the chamber 20 to around 60° C. This elution is continued so long as the content of solvent of the nitrogen issuing from the vessel 1 is sufficient. As soon as the analyser 12 detects a predetermined drop in this content, it closes the valve 11 and one proceeds to a new adsorption stage.

If the purified gas is nitrogen, no prior purging of the vessel 1 is necessary and it is the gas contained in this vessel which is circulated in a closed loop at the beginning of the desorption.

In any case, the heating by means of the coil 32 is continued throughout the desorption.

When the desorption has finished, the mass of activated carbon is at elevated temperature which must be lowered before starting a new adsorption stage. For this purpose, a cold fluid may be circulated in the coil 32 and/or a nonheated gaseous nitrogen current may be passed through the mass of carbon, at least so long as the temperature level remains sufficiently high. The hot gas recovered at the outlet may be either used directly or as a desorption fluid of another purifying vessel of the plant or sent to a heat accumulating exchanger for subsequent use of the heat. During the cooling stage, it is advantageous, in order to homogenize the thermal exchanges, to circulate the gas contained in the vessel 1 or a charge of nitrogen as before in a closed loop through the conduit 5.

3—Recovery of the solvent

The gas issuing from the exchanger 33 passes in succession through a devesiculating device 34 and then the heat exchangers 24, 25 and 26, the latter being maintained at a cold temperature, for example at −80° to −100° C., between the condensation and solidification points of the solvent. The gas issuing from the exchanger 26 passes through a devesiculating device 35, then (in the case now of purified nitrogen) the exchanger 25 countercurrent to the gas coming from the exchanger 24; depending on its residual content of solvent measured by an analyser 36, the nitrogen issuing from the exchanger 25 is either sent to the chamber 20 or discharged through the flue 19.

Thus the liquid solvent is recovered principally through the purge 27 of the exchanger 26 and secondarily in the devesiculating device 35 (droplets entrained by the stream of nitrogen). In some cases, the droplets may also be recovered in the devesiculating device 34 and the exchanger 24.

The loop 28 for refrigerating the final exchanger 26 is maintained at a constant temperature by vaporizing in the exchanger 29 a flow of liquid nitrogen controlled by a valve 37 piloted by a temperature probe 38 connected in this loop. The nitrogen thus vaporized and issuing from the exchanger 29 at around −100° C. thereafter passes through the exchanger 25 countercurrent to the gas coming from the exchanger 24 and is then at least partly sent to the chamber 20.

The nitrogen which serves to cool the trap 2 is generally largely in excess relative to the requirements of nitrogen for the desorption of the vessel 1, and the excess nitrogen may be discharged through the flue 19 or be used, for example for rendering all or a part of the associated machine using the solvent inert. However, for reasons of safety and in case of need, there is also provided a direct feeding of the chamber 20 from the storage vessel 30 through a conduit 39 and a conduit 40 connecting this chamber to the flue, the conduits 39 and 40 being so controlled as to maintain the pressure of the chamber 20 permanently between predetermined low-pressure BP and high-pressure HP.

On the other hand, in some cases, the nitrogen vaporized for cooling the trap 2 may be insufficient to ensure the desorption of the vessel 1. In such cases, this gaseous nitrogen will be completed by gaseous nitrogen coming from an appropriate source (evaporator or bank of cylinders).

In any case, the refrigerating trapping acts on a gaseous stream which has a distinctly higher concentration of solvent than the initial gas to be treated, which results, in respect of the trap 2, in a considerable saving in investment costs and in negative calories relative to a refrigerating trapping exerted directly on the initial gas. For example, if the latter contains 2 $g/m^3$ of solvent, the desorption nitrogen may contain 300 $g/m^3$ thereof. This important advantage would continue to exist in the case of a variant in which the desorption nitrogen does not circulate in a closed loop before being sent to the trap 2, provided a preheating of the vessel 1 is provided which is sufficient to reach a suitable desorption temperature (130° C. in the example described hereinbefore).

Figure 2:
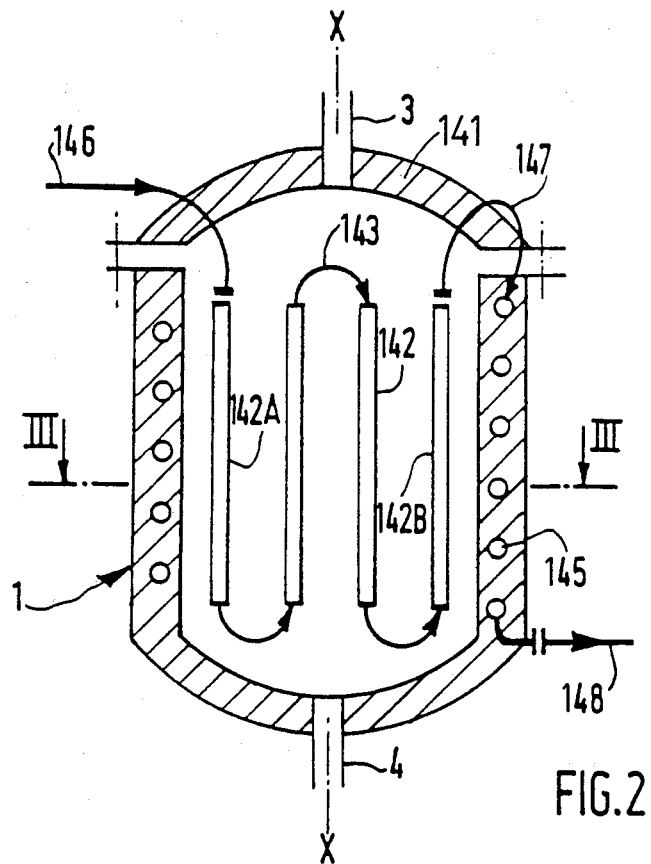
FIG. 2 is a diagrammatic view of a variant of the adsorber vessel of said plant.
Figure 3:
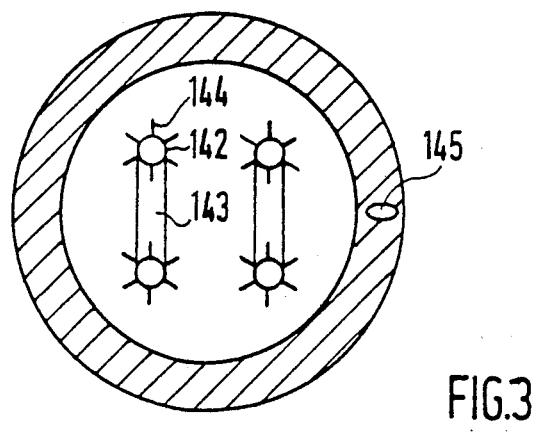
FIG. 3 is a sectional view taken on line III—III of FIG. 2.

The adsorber vessel 1 illustrated in FIGS. 2 and 3 may advantageously be used in the plant shown in FIG. 1. It comprises a detachable upper cover 141 and, in the mass of activated carbon, a number of heat exchange tubes 142 connected in series by elbows 143 and replacing the coil 32 of FIG. 1. These tubes 142, which have been brought into the same plane as FIG. 2 for reasons of clarity, are parallel to the axis X—X of the vessel and provided with longitudinal outer fins 144 shown in FIG. 3. The cylindrical wall of the vessel is provided with a hollow coil 145. The first tube 142A may be connected through a conduit 146 to a source of a heating or cooling fluid, the last tube 142B may be connected through a conduit 147 to the inlet of the coil 145, and the outlet of the latter may be connected to a conduit 148 for discharging said fluid.

In the case where the treated gas is air, in the absence of a special precaution, the activated carbon may retain with the solvent all or a part of the humidity contained in this air. Consequently, upon the desorption regeneration of the carbon, the elution nitrogen is charged not only with the solvent to be recovered but also with water, and this water is condensed in the refrigerating trap 2. Apart from resulting risks of the clogging of the cold parts of this trap, this reduces the quality of the recovered solvent by yielding either a solution, for hydrosoluble solvents, or an emulsion or a heterogeneous mixture for non-watersoluble solvents. The recovered liquid must therefore be either redistilled or decanted; consequently there is lost one of the advantages of the regeneration of the activated carbon with nitrogen over the process employing steam, namely the obtainment of a solvent which is directly valorizable by re-utilization.

As shown in dot-dash lines in FIG. 1, this drawback may be avoided by eliminating the water upstream of the trap 2 by means of an adsorber vessel provided with a molecular sieve specialized in the retention of water and having in particular the property of retaining the humidity and allowing through the solvent.

At frequencies determined by the saturation of the molecular sieve, which itself depends on the relative humidity of the air charged with the solvent to be recovered, the molecular sieve is regenerated by a stream of hot nitrogen at the temperature prescribed by the manufacturer of the molecular sieve, namely 200°-250° C. The issuing stream consisting of nitrogen and steam reaches the flue 19 and is discharged.

In a first variant (not shown), the humidity of the treated air is removed at the head end of the plant before passage through the activated carbon, by passage of the stream of air charged with solvent through a bed of a drying molecular sieve disposed in the conduit 7. Thus, the conduit 10 only carries dry gas charged with solvent which is condensed in the trap 2.

With such an arrangement, the whole of the humidity of the entering air is stopped whereas the activated carbon traps generally only a fraction of this humidity in the absence of a molecular sieve at the head end of the plant. It is for this reason more advantageous to employ the arrangement illustrated in dot-dash lines in FIG. 1: a molecular sieve bed 41 is interposed in the circuit leading from the vessel 1 to the trap 2 and preferably between the devesiculating device 34 and the first heat exchanger 24 of the trap 2.

In the two aforementioned variants and in the conventional manner, two molecular sieve beds are advantageously used in parallel, one being in the water adsorption stage and the other in the desorption stage. Further, the molecular sieve is regenerated by a hot stream of nitrogen taken from the chamber 20 through a conduit 42 provided with a reheater 43. The nitrogen charged with water is then discharged through a conduit 44 and the flue 19.

Moreover, in both variants, a substantial improvement in the nitrogen consumption balances may be obtained by using a preheating of the molecular sieve bed similar to that described hereinbefore in respect of the vessel 1. Indeed, the regeneration of the molecular sieve requires the use of a scavenging of gas at a temperature of 200°-250° C. Now, the sensible heat of nitrogen is very low and a large volume thereof is therefore required to provide the heat required for heating the adsorbent up to 200°-250° C. and to provide the heat of vaporization of the water.

This is why the drying molecular sieve is preferably disposed in a vessel of the type of that described with reference to FIGS. 2 and 3. It is then possible to pass through the heat exchanger with which this vessel is provided a hot fluid, for example steam superheated to 150°-200° C. so as to preheat the adsorbent bed. A scavenging with nitrogen simultaneously with and/or after the preheating enables the adsorbed water to be entrained at the lowest cost. As in the case of the vessel 1, the preheating may be accompanied by a circulation of nitrogen in a closed loop. For the return of the sieve to the cold temperature for the adsorption of the water, the procedure is that described hereinbefore in respect of the vessel 1.

We claim:

1. A process for eliminating an impurity from a gas by adsorption on activated carbon, characterized in that the activated carbon is desorbed by passing a current of inert gas through the activated carbon and then in a refrigerating trap maintained at a temperature of condensation of said impurity, the desorption comprising a preheating stage in which a charge of inert gas is circulated in a closed loop through the activated carbon until its content of impurity reaches a predetermined threshold, and an elution stage in which a stream of inert gas is circulated through the activated carbon and sent to the refrigerating trap.

2. A process for eliminating an impurity from a gas by adsorption on activated carbon, comprising passing said gas through activated carbon to absorb said impurity on said activated carbon, and thereafter desorbing the impurity from the activated carbon by passing a current of inert gas through the activated carbon and then to a refrigerating trap at a temperature of condensation of said impurity, cooling said refrigerating trap by vaporizing an inert gas stored in liquid phase, and passing at least a part of the inert gas thus vaporized through said activated carbon to desorb the activated carbon.

3. A process according to claim 2, characterised in that the activated carbon and/or the inert gas is heated during the desorption operation.

4. A process according to claim 3, characterised in that the activated carbon is cooled after the end of the desorption operation and/or during the adsorption stage.

5. A process according to claim 2, characterised in that at least a part of the vaporized inert gas is used for rendering inert a machine from which comes the gas to be treated.

6. A process according to claim 2, for the purification of a humid gas, characterised in that said gas is previously passed through a molecular sieve bed.

7. A process for eliminating an impurity from a gas by adsorption on activated carbon, characterized in that the activated carbon is desorbed by passing a current of inert gas through the activated carbon and then in a refrigerating trap (2) maintained at a temperature of condensation of said impurity and cooled by vaporization of said inert gas stored in the liquid form, at least a part of the inert gas thus vaporized being used for effecting the desorption of the activated carbon, the desorption comprising a preheating stage in which a charge of inert gas is circulated in a closed loop through the activated carbon until its content of impurity reaches a predetermined threshold, and an elution stage in which a stream of inert gas is circulated through the activated carbon and sent to said refrigerating trap (2).

8. A process for eliminating an impurity from a gas by adsorption on activated carbon, characterized in that the activated carbon is desorbed by passing a current of inert gas through the activated carbon and then in a refrigerating trap (2) maintained at a temperature of condensation of said impurity and cooled by vaporization of said inert gas stored in the liquid form, at least a part of the inert gas thus vaporized being used for effecting the desorption of the activated carbon, and circulating a charge of inert gas in a closed loop through the activated carbon during the heating stage and/or during the cooling stage.

9. A process for eliminating an impurity from a gas by adsorption on activated carbon, characterized in that the activated carbon is desorbed by passing a current of inert gas through the activated carbon and then in a refrigerating trap (2) maintained at a temperature of condensation of said impurity and cooled by vaporization of said inert gas stored in the liquid form, at least a part of the inert gas thus vaporized being used for effecting the desorption of the activated carbon, and passing the desorption gas through a molecular sieve bed (41) between its outlet of the activated carbon and its inlet in the refrigerating trap (2).

10. A process according to claim 9, characterised in the the molecular sieve (41) is regenerated by means of a heated current of said inert gas, preferably with preheating of the molecular sieve.

11. A plant for purifying a gas by adsorption, of the type comprising an adsorber vessel (11) filled with activated carbon, characterised in that it comprises means (29) for vaporizing a liquified inert gas, means (13, 20) for feeding the adsorber vessel with at least a part of the thus vaporized inert gas, and means (2) for cooling the gas issuing from said vessel (1) by heat exchange with the inert gas in course of vaporization.

12. A plant according to claim 11, characterised in that it comprises means (5, 6) for circulating in a closed loop the gas contained in the adsorber vessel (1).

13. A plant according to claim 12, characterised in that it comprises a molecular sieve bed (41) interposed between the adsorber vessel 1 and the refrigerating trap (2).

14. A plant for purifying a gas by adsorption, comprising an adsorber vessel filled with activated carbon, a refrigerating trap, means for feeding the vessel with inert gas, means for heating the activated carbon, means for circulating a charge of inert gas in a closed loop through the activated carbon, and means for sending gas from said vessel to said trap.

* * * * *